United States Patent [19]

Reed

[11] Patent Number: 4,553,248

[45] Date of Patent: Nov. 12, 1985

[54] ANALOG ADAPTIVE MAGNITUDE EQUALIZER

[75] Inventor: Todd R. Reed, Boulder, Colo.

[73] Assignee: International Business Machines Corporation, Armonk, N.Y.

[21] Appl. No.: 502,920

[22] Filed: Jun. 10, 1983

[51] Int. Cl.$^4$ ............................................. H04B 3/14
[52] U.S. Cl. .................................... 375/14; 455/303; 333/18
[58] Field of Search .................... 375/12, 14; 455/296, 455/303, 306; 333/18; 178/69 R, 69 M; 330/124, 126; 381/98, 101, 103

[56] References Cited

U.S. PATENT DOCUMENTS

| | | | |
|---|---|---|---|
| 3,750,026 | 7/1973 | Watanabe | 375/12 |
| 3,851,266 | 11/1974 | Conway | 328/162 |
| 3,875,333 | 4/1975 | Nakano et al. | 375/101 |
| 3,904,824 | 9/1975 | Caragliano et al. | 178/70 R |
| 3,921,072 | 11/1975 | Sato | 375/14 |
| 3,943,468 | 3/1976 | Cox et al. | 333/18 |
| 3,978,435 | 8/1976 | Luvison et al. | 333/18 |
| 4,003,006 | 1/1977 | Mandeville et al. | 375/12 |
| 4,177,356 | 12/1979 | Jaeger et al. | 381/103 |
| 4,251,782 | 2/1981 | Bynum | 375/12 |
| 4,306,306 | 12/1981 | Saenz | 375/14 |
| 4,467,287 | 8/1984 | Aylward | 330/126 |

OTHER PUBLICATIONS

R. W. Lucky, "Automatic Equalization for Digital Communication", Bell Sys. Tech. J., vol. 44, pp. 547-588, Apr. 1965.
R. W. Lucky, "Techniques for Adaptive Equalization of Digital Communication Systems", Bell Sys. Tech. J., vol. 45, pp. 255-286, Feb. 1966.
D. Hirsch & W. J. Wolf, "A Simple Adaptive Equalizer for Efficient Data Transmission", IEEE Trans. Commun., vol. Com-18, pp. 5-12, Feb. 1970.
D. A. George, R. R. Bowen, & J. R. Storey, "An Adaptive Decision Feedback Equalizer", IEEE Trans. Commun., vol. Com-19, pp. 281-293, Jun. 1971.
IBM Technical Disclosure Bulletin, "Bandpass Filter Using Differential Amplifier", G. L. Clapper, vol. 14, No. 3, pp. 815-816, Aug. 1971.
K. H. Mueller, "A New, Fast-Converging Mean-S-quare Algorithm for Adaptive Equalizers with Partial-Response Signaling", Bell Sys. Tech. J., vol. 54, pp. 143-153, Jan. 1975.
W. Schmidt, "An Automatic Adaptive Equalizer for Digital Data Transmission", 1978 IEEE Intern. Symp. of Circuits & Systems Proc. N.Y., pp. 436-440.
W. Rupprecht, "A Hybrid Adaptive Equalizer System for High Speed Digital Transmission", 1980 IEEE Intern. Symp. on Circuits & Systems Proc. N.Y., pp. 580-584.

Primary Examiner—Benedict V. Safourek
Attorney, Agent, or Firm—Homer L. Knearl; Carl M. Wright

[57] ABSTRACT

Bandpass filters are used to sample the output signal from the equalizer. These samples are amplified in variable gain amplifiers and summed with the input signal to achieve equalization. The amount of gain applied to each sample is based on the difference between each sample's magnitude and a reference signal. In one embodiment, the reference signal is derived from the adjacent bandpass sample. In another embodiment, one bandpass sample is the reference for comparison with all other samples. In the third embodiment, bandpass filters are also connected to the input signal in order to achieve a feed-forward rather than feedback configuration for the equalizer. In all of the embodiments, the magnitude signals from the bandpass samples are weighted before being compared to the reference signal. The weighting factors allow the filter to be designed for a desired transfer function and adapted to an input signal spectrum.

12 Claims, 6 Drawing Figures

ANALOG ADAPTIVE MAGNITUDE EQUALIZER

FIELD OF THE INVENTION

This invention relates to a magnitude equalizer for equalizing the magnitude characteristic of a transfer function of a channel. The transfer function of the channel should be equalized both in phase and magnitude. However, the present invention relates only to the magnitude equalization. Further, the magnitude equalization is adaptive as a function of the amplitude characteristic of the input analog signal that the equalizer receives.

BACKGROUND OF THE INVENTION

Low cost peripheral devices, such as floppy disk drives, for personal computers can be enhanced in performance by the use of equalizer circuits in their read/write channels. The typical adaptive magnitude equalizer circuit is very expensive and would exceed the cost of the floppy disk drive the equalizer would be used in.

In the past, adaptive magnitude equalizers have been implemented with tapped delay lines and digital-to-analog converters. While such devices work well, they are very expensive.

Examples of patents showing various implementations of magnitude equalizers utilizing a tapped delay line include U.S. Pat. Nos. 3,750,026, 3,875,333 and 3,978,435. Adaptive equalizers of this type have used digital-to-analog converters (DAC's) or spectrum analyzers to make them adaptive. In all cases, these are very expensive equalizers. The cost of the DAC or the spectrum analyzer eliminates these equalizers from use in low-cost peripheral devices.

An alternative design is shown by W. Rupprecht, "A Hybrid Adaptive Equalizer System for High Speed Digital Transmission," *IEEE International Symposium on Circuits and Systems Proceedings*, (New York 1980) pp. 580–584. Rupprecht uses phase shifting filters in place of tapped delay lines. A microcomputer generates the weighting factors used in the equalizer to make it adaptive. The speed of the microcomputer is too slow for many adaptive equalizer applications and definitely too slow for high speed data storage devices.

SUMMARY OF THE INVENTION

The present invention has achieved a high-speed, low-cost adaptive magnitude equalizer by summing the input signal with gain-controlled bandpass samples of the input signal or the output signal of the equalizer. The gain applied to each bandpass sample is dynamically adjusted by envelope-detecting the output signal from each bandpass filter, comparing that output signal to a reference signal and adjusting the gain as a function of the difference between the filtered output signal and the reference signal.

The filtered output signal and the reference signal are weighted prior to being subtracted. The weights are in inverse proportion to (1) the spectral content at the bandpass center frequency of the input signal and (2) the magnitude of the desired transfer function at the bandpass center frequency. For example, if the input signal has twice the energy at the center frequency of one bandpass filter as it has at the center frequency of a second filter, the weight associated with the second filter will be twice that of the first filter.

In one case, the reference signal is an envelope-detected output signal from a reference bandpass filter connected to the output of the summming circuit. The center frequency of this reference filter is near a maximum and substantially constant portion of the unequalized channel response. Alternatively, the reference signal is an envelope-detected output signal from the bandpass filter adjacent in frequency to the bandpass filter whose output signal is being gain adjusted.

Preferably, the bandpass sample is taken from the output of the summing circuit which is the output of the equalizer. However, in a feed-forward configuration two bandpass filters might be used for each bandpass sample. One filter is still connected to the output of the summing circuit; its output signal goes to the envelope-detector from which the comparisons and gain adjustments are made. The other filter receives as its input the input signal of the equalizer. The output signal of this second filter is gain adjusted and fed-forward to the summing circuit. This feed-forward configuration will not go unstable and oscillate as the feedback configuration might. Therefore, for greater frequency ranges this feed-forward configuration may be preferred.

BRIEF DESCRIPTION OF DRAWING

The invention is described in detail below with reference to figures, illustrating specific embodiments of the invention, in which.

DETAILED DESCRIPTION

Figure 1:
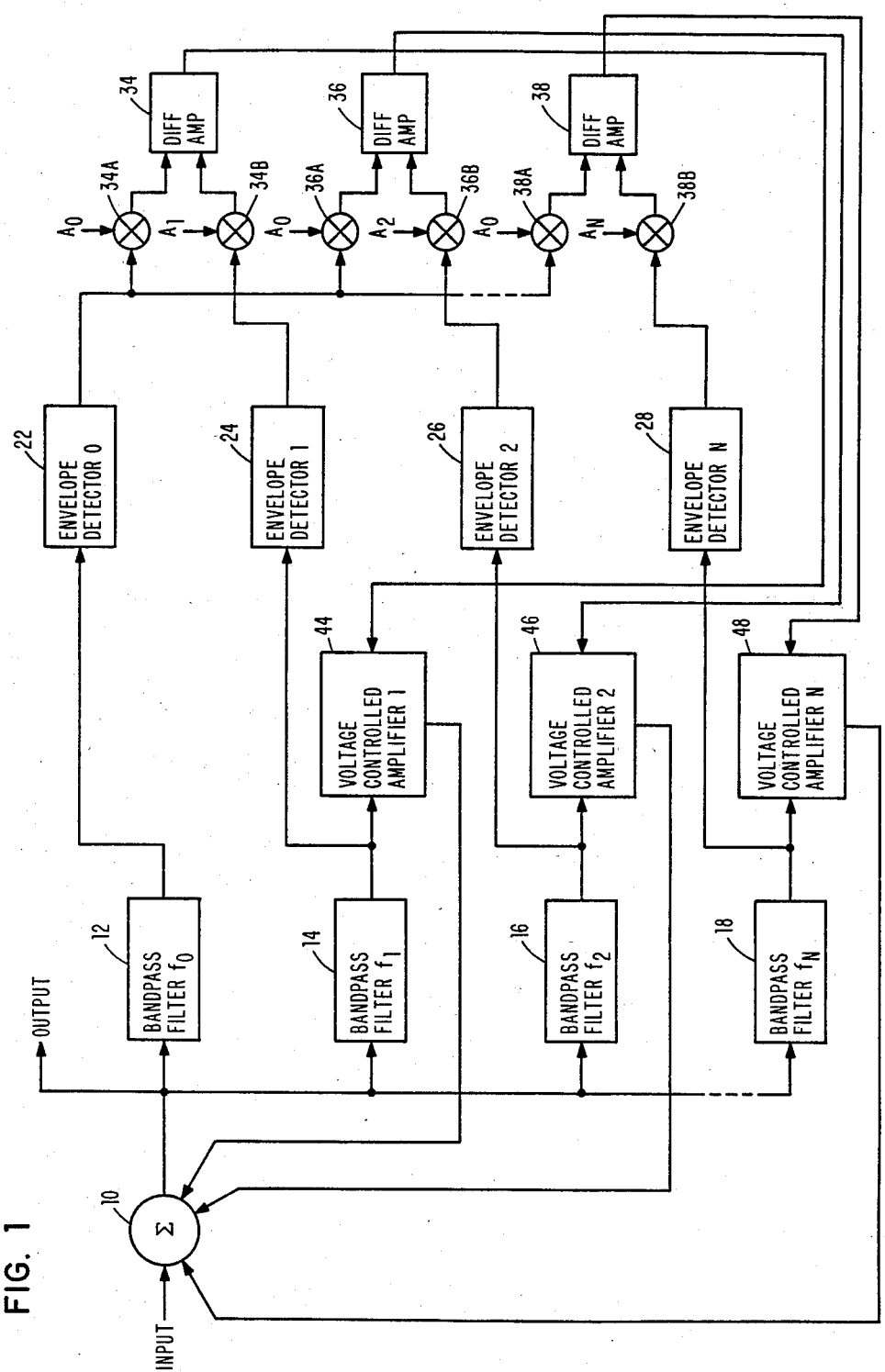
FIG. 1 is a block diagram of one embodiment of the invention where one bandpass filter is used to provide the bandpass sample for the envelope-detector and the gain adjusted bandpass sample fedback to the summing circuit.

The schematic implementation of the invention in FIG. 1 is a feedback embodiment of the invention.

The output signal from the magnitude equalizer is passed through bandpass filters, and the bandpass samples are gain-adjusted and fedback to the summing circuit. At the summing circuit, the bandpass signals are added to the input signal to make up the equalized output signal.

The input signal is applied to summing circuit 10. The output signal from the summing circuit 10 is the equalizer output signal and is also applied to bandpass filters 12, 14, 16 and 18. Band pass filter 12 provides the bandpass sample that becomes the reference signal after the sample has been envelope-detected. The output signals from envelope-detectors 22, 24, 26, and 28 follow slowly varying changes in amplitudes of the bandpass samples from filters 12, 14, 16, and 18, respectively.

The weighting factors, based on the input signal spectrum and the desired transfer function, are applied at the outputs of the envelope-detectors 22–28. These weighting factors could be incorporated into the envelope-detectors 22–28 or into the difference amplifiers 30, 32 and 34 as weighting resistors. For illustration, the weighting factors are applied by multipliers 34A, 34B, 36A, 36B, 38A, and 38B to the input signals at difference amplifiers 34, 36, and 38, respectively.

Each of the difference amplifiers subtracts the weighted amplitude of one bandpass sample from the weighted amplitude of the reference bandpass sample. The absolute value of this difference is used to control the gain of voltage-controlled amplifiers 44, 46, and 48.

As an example of operation, bandpass filter 14 passes a bandpass sample of the output signal centered about a frequency $f_1$. Envelope detector 24 detects the magnitude or amplitude of this bandpass sample and applies it to the weighting multiplier 34B. At the same time, weighting multiplier 34A receives the magnitude signal derived from the reference bandpass sample. The reference bandpass sample comes from filter 12 and is envelope-detected by detector 22.

Difference amplifier 34 subtracts the two weighted magnitude signals and generates a difference signal which is used to adjust the gain of voltage control amplifier 44. The gain adjusted bandpass sample from amplifier 44 is passed back to the summing circuit 10 where the sample is added to the other gain adjusted bandpass samples and the input signal. The result is the equalized output signal. In effect, each bandpass sample is boosted or attenuated in accordance with its comparison to the reference frequency as weighted by the weighting factors. The weighting factors are used to achieve a desired transfer function based on a defined input signal spectrum.

Figure 2A:
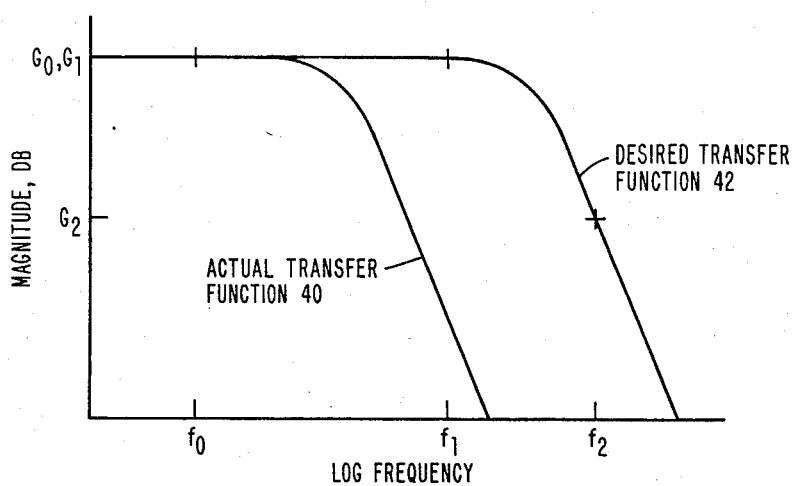
FIG. 2A is an example of an actual and desired transfer function for a channel.
Figure 2B:
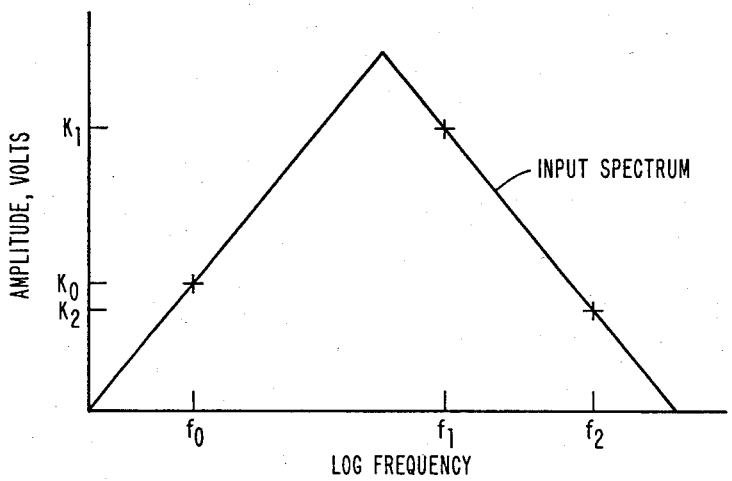
FIG. 2B is an example of one input signal spectrum showing some of the constants used in determining the weighting factors used in the equalizer to achieve the desired transfer function.
Figure 3:
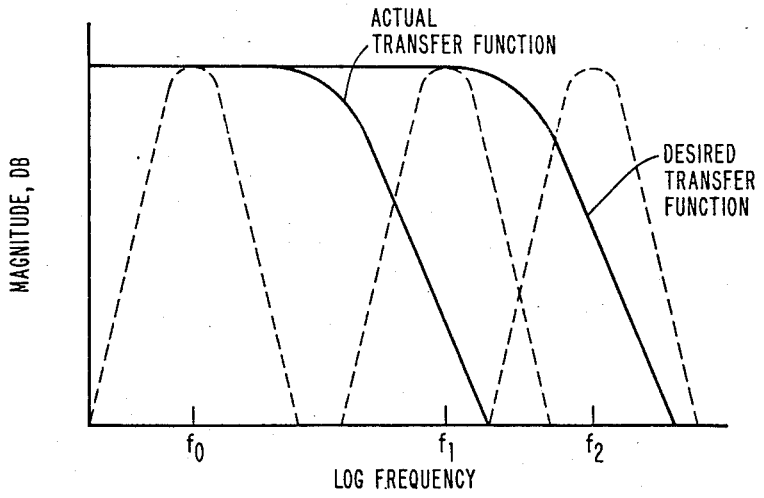
FIG. 3 is a comparison of the actual and desired transfer functions with the transfer functions of the bandpass filters for the examples in FIGS. 2A and 2B.

The selection of the center frequency for the bandpass filters and the selection of the weighting factors can be illustrated with an example as depicted in FIGS. 2A, 2B and 3. The actual transfer function 40 in FIG. 2A, when compared with the input spectrum in FIG. 2B, would severely attenuate the input signal above the frequency $f_1$. Accordingly, the desired transfer function 42 would not roll off until it reaches frequencies at the extreme of the input signal spectrum.

The input signal spectrum, shown in FIG. 2B, is triangular in shape. This spectrum was selected for the example because coded information for recording on a floppy disk drive often has a spectrum approximating this triangular shape.

The first step in determining the weighting factors used in FIG. 1 is to select the center frequency of the bandpass filters. The center frequency for bandpass filter 12 in FIG. 1, which is the reference bandpass frequency, is selected so that it is located in a portion of an actual transfer function where the magnitude is at a maximum and is relatively constant. Accordingly, the center of frequency for bandpass filter 12 is $f_0$ as shown in FIG. 3.

In the examples of FIGS. 2 and 3, only three bandpass filters are used. The filters other than the reference filter are selected so that all the filters are distributed over the input signal spectrum and are in a position to boost the actual transfer function to the desired transfer function. Accordingly, the center frequency for bandpass filter 14 in FIG. 1 will be selected as $f_1$ in FIG. 3, whereas the center frequency for bandpass filter 16 in FIG. 1 will be selected as $f_2$ in FIG. 3.

With the center frequencies of the bandpass filters selected, it is now possible to determine the weighting factors to be used at the inputs to the difference amplifiers. The weighting factors are given by the following expression:

$$A_N = 1/K_N G'_N$$

where $G'_N = 10^{G_N/20}$

The constants $K_N$ and $G_N$ for each center frequency $f_N$ may be determined empirically from the input signal spectrum and the desired transfer function. In FIG. 2A, the values for $G_0$, $G_1$, and $G_2$ are determined by the value of the desired transfer function at frequencies $f_0$, $f_1$, and $f_2$ of the bandpass filters. Similarly, in FIG. 2B the values for $K_0$, $K_1$, and $K_2$ are given by the amplitude of the input signal spectrum at frequencies $f_0$, $f_1$, and $f_2$. With these constants known, the values for the weighting factors $A_0$, $A_1$, and $A_2$ may be calculated from the above expression.

In the circuit of FIG. 1, with values $A_0$, $A_1$, and $A_2$ used for the weighting factors at multipliers 34A, 34B, 36A and 36B, the equalizer will produce the desired transfer function 42 for an input signal spectrum that approximates that shown in FIG. 2B. Bandpass filter 18 and its associated voltage-controlled amplifier 48, envelope-detector 28 and difference amplifier 38 are not used.

Figure 4:
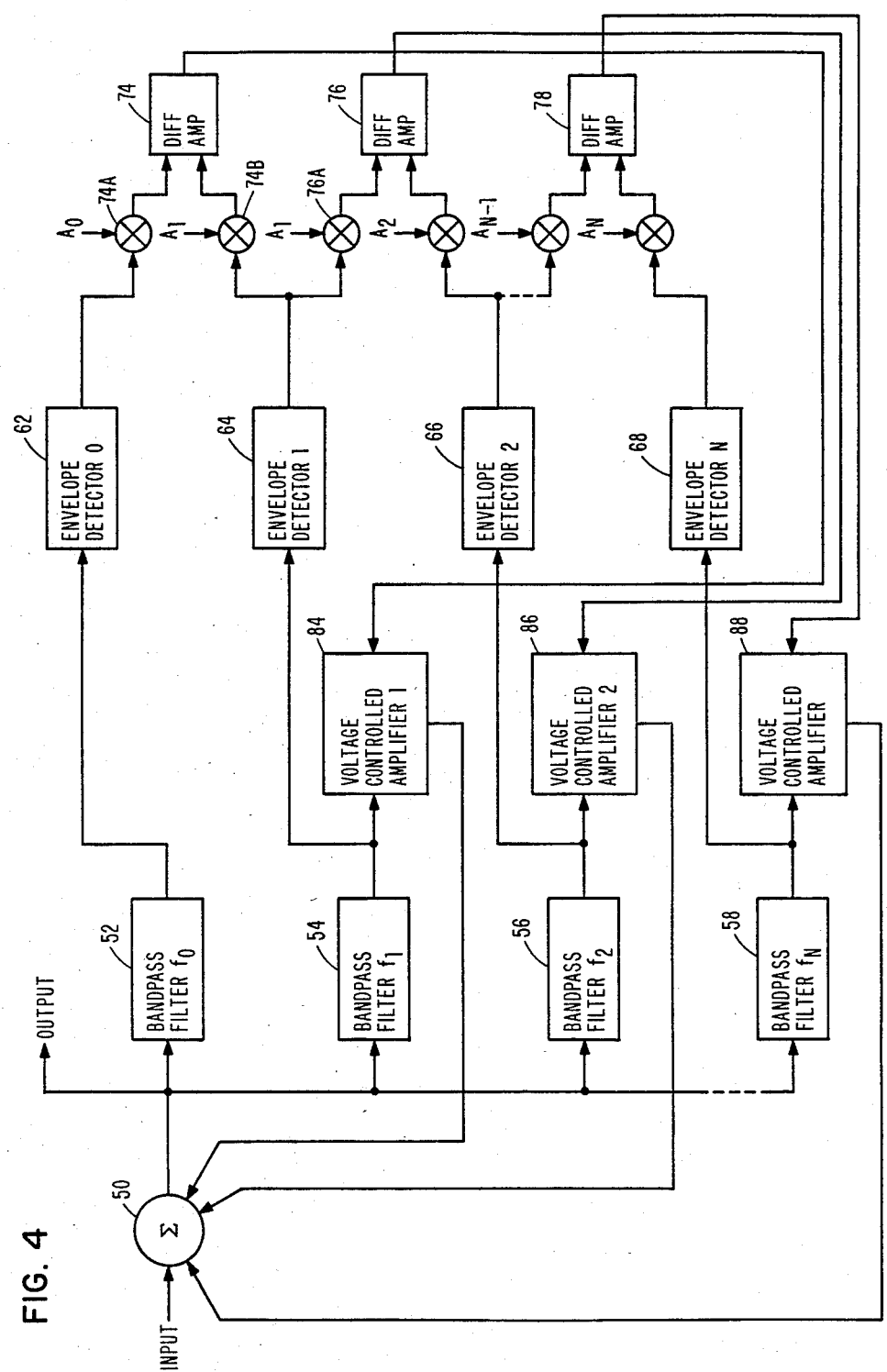
FIG. 4 is a block diagram of a second, feedback embodiment of the invention where the reference signal is based on an adjacent bandpass sample.

In FIG. 4, another embodiment for the invention compares envelope-detected bandpass samples from filters, whose bandpass samples are adjacent, to generate the difference signal used to control the gain of voltage-controlled amplifiers. In this embodiment, the output signal from summing circuit 50 is passed to bandpass filters 52, 54, 56 and 58 that function in the same manner as the filters 12–18 in FIG. 1. Similarly, the voltage-controlled amplifiers 84, 86, and 88, and envelope-detectors 62, 64, 66, and 68 operate in the same manner as their counterparts in FIG. 1.

The significant difference between the implementations of the invention in FIG. 4 and FIG. 1 is that difference amplifiers 74, 76, and 78 are generating signals indicating the difference between weighted magnitudes of bandpass samples that are adjacent in the frequency spectrum. Thus, for example, the reference signal derived from the reference bandpass sample by envelope-detector 62 is only applied to difference amplifier 74 through the weighting factor multiplier 74A.

The envelope-detected bandpass sample from bandpass filter 54 is applied to difference amplifier 74 and 76 through weighting factor multipliers 74B and 76A. This circuit configuration is duplicated for all the difference amplifiers in the embodiment of FIG. 4.

The magnitude of each bandpass sample as detected by the envelope-detectors is a measure of the energy in that sample. Accordingly, the magnitude for each sample may be viewed as an energy measure or energy factor for the sample.

As shown in FIG. 4, the difference signal from difference amplifier 74 is based upon the bandpass samples from filters 52 and 54. The difference signal from difference amplifier 76 is based upon the bandpass samples from bandpass filters 54 and 56.

In effect, the gain applied to the bandpass sample from bandpass filter 54 is based upon that sample's energy relative to the energy in the reference bandpass sample from filter 52. Similarly, the gain applied to the bandpass sample from filter 56 is based upon the difference in energy of that bandpass sample's spectral content to energy in the spectral content of the sample from bandpass filter 54. Thus, the bandpass samples are gain controlled in a domino fashion using the adjacent lower frequency filter in the spectrum as a reference.

The weighting factors applied to the envelope-detected energy factors for the bandpass samples in FIG. 4 would be the same as those used in FIG. 1. These weighting factors would be determined in the same way as previously described for the examples in FIGS. 2A, 2B and 3. The fact that the difference amplifiers are comparing adjacent detected bandpass samples does not change the manner in which the weighting factors $A_N$ are determined.

Both of the embodiments in FIGS. 1 and 4 are feedback embodiments. The invention may be also implemented in a feed-forward configuration, although an additional bandpass filter for each bandpass sample is required. However, this feed-forward configuration has the advantage that its stability is guaranteed over the frequency range of operation.

Figure 5:
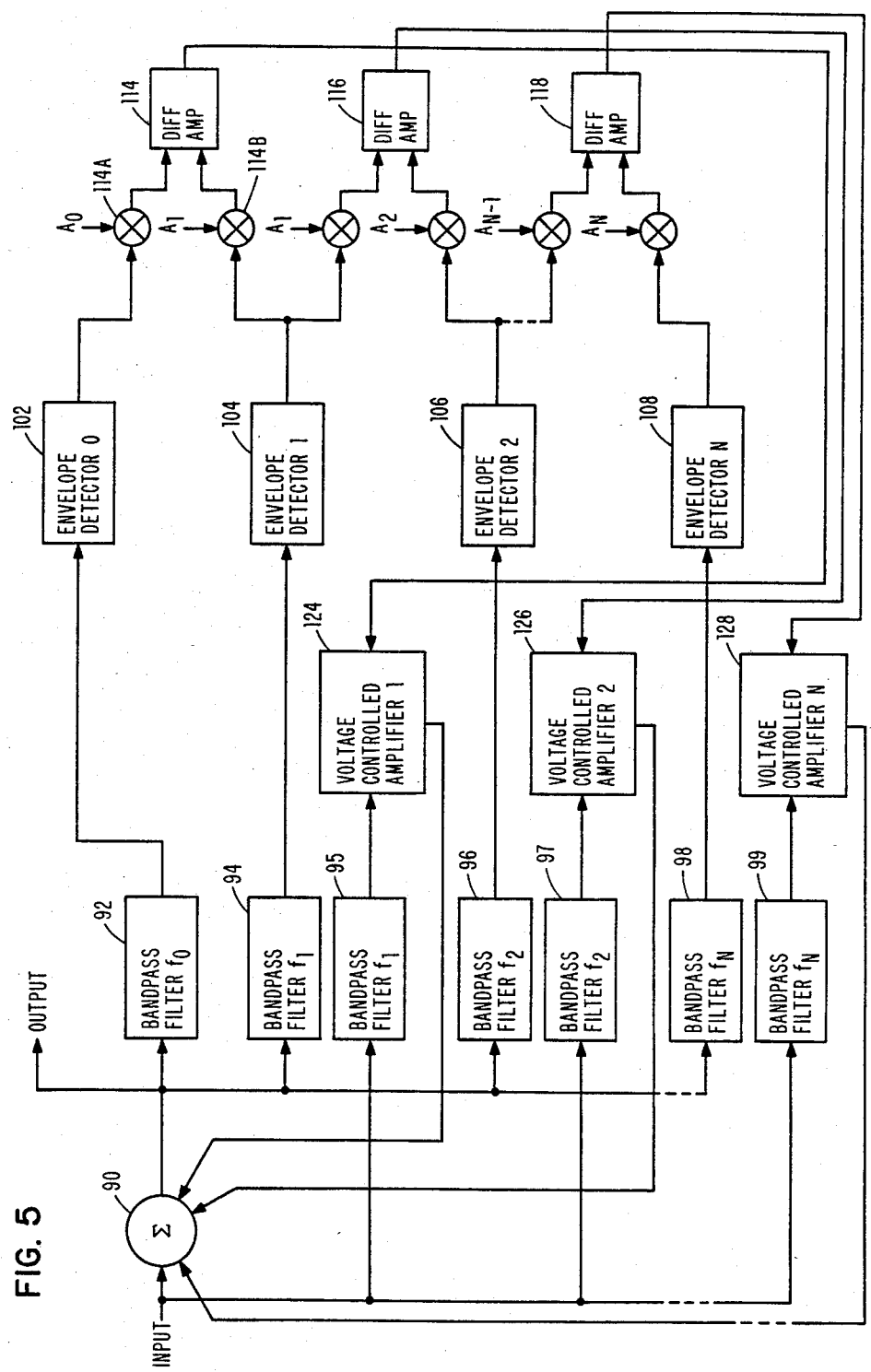
FIG. 5 is a block diagram of a feed-forward embodiment using two bandpass filters for each bandpass sample—one for the envelope-detector and one for the gain adjustment.

FIG. 5 shows a feed-forward embodiment of the invention. The input signal is applied to summing circuit 90 and bandpass filters 95, 97, and 99. The bandpass sample out of bandpass filters 95, 97, and 99 is amplified by voltage-controlled amplifiers 124, 126, and 128. The gain-controlled bandpass sample is then fed-forward to the summing circuit 90 to be added to the input signal. This feed-forward configuration, where the gain-controlled signal is based upon bandpass sample of the input signal of the equalizer, is the significant difference from the embodiments in FIGS. 4 and 5.

The output signal from the equalizer is applied to bandpass filters 92, 94, 96, and 98 for the purpose of generating the bandpass samples used by the envelope-detectors and difference amplifiers in the same manner as previously described for FIG. 4. Accordingly, envelope-detectors 102, 104, 106, and 108 generate the signals representing the magnitude of the bandpass sample filtered from the output signal of the equalizer.

The envelope-detected sample is multiplied by the appropriate weighting factor by multipliers and applied to the associated difference amplifier. For example, difference amplifier 114 receives the weighted magnitude of the bandpass sample from multipliers 114A and 114B. In the same manner, difference amplifier 116 receives the weighted magnitudes of bandpass samples from the bandpass filters 94 and 96. Difference amplifier 118 receives the weighted magnitudes of the bandpass samples having center frequencies of $f_N$ and $f_{N-1}$.

The weighting factors $A_N$ are the same as the weighting factors used in FIGS. 1 and 4 and may be determined in the same way as described for the example in FIGS. 2A, 2B, and 3. Thus, the significant difference in the embodiment of FIG. 5 is that there are two bandpass filters having the same center frequency for each of the bandpass samples except the reference bandpass.

For a center frequency $f_1$, bandpass filter 94 and bandpass filter 95 have the same center frequency. Bandpass filter 94 is filtering the output signal of the equalizer, while bandpass filter 95 is filtering the input signal of the equalizer. Thus, one bandpass filter 94 is utilized to generate the control signal, and the other bandpass filter 95 is utilized to provide a gain control sample that is fed-forward to the summing means 90.

The bandpass characteristic of each pair of filters having the same center frequency need not be the same. It may be desirable to shape each bandpass characteristic for the function each filter performs. For example, filters providing the bandpass sample that is gain-controlled might have a wide bandpass characteristic, whereas the filters providing the bandpass sample for the envelope-detectors might have a narrow bandpass. In this way, the weighted magnitudes from the envelope-detectors would be tied closely to the center frequency components. On the other hand, the gain-controlled samples could have a broader frequency spectrum so that when boosted or attenuated they would conform to the desired transfer function optimally.

It will be appreciated by one skilled in the art that there are many other configurations that could be used to embody the invention in feed-forward or feedback implementations. In addition, the technique used in FIG. 1, where the difference amplifiers compare each weighted amplitude from a bandpass sample to the weighted amplitude of the reference bandpass sample, might be applied to the embodiment in FIG. 5. Similarly, while the embodiments shown are all voltage-controlled embodiments, one skilled in the art could easily develop a current control equivalent to implement the invention.

While I have illustrated and described the preferred embodiments of my invention, it is understood that I do not limit myself to the precise constructions herein disclosed and the right is reserved to all changes and modifications coming within the scope of the invention as defined in the appended claims.

What is claimed is:

1. In a signal-channel magnitude equalizer for producing a desired transfer function, said equalizer having a plurality of bandpass filter means for deriving bandpass samples related to the input signal, the improvement comprising:

reference filter means for for deriving a reference bandpass sample;

means for detecting the energy in the frequency spectrum of the bandpass sample passed by each filter including the reference filter and generating an energy factor for each bandpass sample;

difference means for subtracting the energy factor of each bandpass sample from the energy factor of an adjacent bandpass sample, at least one adjacent sample being the reference bandpass sample;

a plurality of amplifying means, each amplifying means paired with a filter means other than said reference filter means, each of said amplifying means for amplifying the bandpass sample from its paired filter;

means responsive to said difference means for adjusting the gain of each amplifying means based on the difference in energy between the spectrum passed by the amplifying means' paired filter and the spectrum of the adjacent bandpass sample; and means for summing the input signal with the amplified bandpass samples to provide the equalized output signal whereby the transfer function of the equalizer adapts to the input signal spectrum.

2. The apparatus of claim 1 and in addition:

means responsive to said detecting means for weighting the energy factor detected for each bandpass sample so that weighted energy factors are applied to said difference means.

3. The apparatus of claim 2 wherein said weighting means includes:

means for multiplying the energy factor for each bandpass sample by a weighting factor inversely proportional to the amplitude of the input signal frequency component at the bandpass center frequency and inversely proportional to the magnitude of the channel transfer function at that same frequency.

4. The apparatus of claims 1, 2, or 3 wherein:

said plurality of bandpass filter means are divided into two sets;

a first set includes said reference filter means and one bandpass filter means for each center frequency used by the equalizer;

a second set includes a second bandpass filter means for each center frequency other than the reference frequency;

said first set connected to the output of the equalizer for generating the energy factors based on bandpass samples of the output signal;

said second set connected to the input of the equalizer for generating the bandpass samples that are amplified by said amplifying means and added to the input signal by said summing means to produce the equalizer output signal.

5. An adaptive magnitude equalizer providing an equalized output signal for a data channel by equalizing signals in the data channel based upon an input signal spectrum and a desired transfer function for the channel, said equalizer comprising:

bandpass means for generating a plurality of bandpass samples from the output signal, said samples distributed over the spectrum of the input signal;

magnitude means responsive to each bandpass sample for generating a bandpass magnitude signal;

means for weighting each bandpass magnitude signal as a function of input signal spectrum and desired transfer function;

means for comparing the weighted magnitude signal of each bandpass sample with a weighted reference signal;

a plurality of amplifying means for amplifying bandpass samples;

means responsive to said comparing means for controlling the gain of said amplifying means so that the amplitude of each amplified bandpass sample is controlled in response to the comparison of the weighted reference signal to the weighted magnitude signal of the bandpass sample having the same center frequency as the amplitude-controlled bandpass sample; and summing means for summing the input signal with the amplitude-controlled bandpass samples to produce the equalized output signal so that the output signal is equalized to the desired transfer function as adapted to the input signal spectrum.

6. The apparatus of claim 5 and in addition:

means for generating said weighted reference signal from the weighted magnitude signal of the bandpass sample adjacent in frequency range to the bandpass sample whose magnitude is being compared to the reference signal by said comparing means.

7. The apparatus of claims 5 or 6 wherein said weighting means includes:

means for multiplying the magnitude signal of each bandpass sample by a weighting factor related to the center frequency of the bandpass sample, said weighting factor varies inversely with the amplitude of the input signal component at the center frequency and inversely with the magnitude of the desired transfer function at the center frequency.

8. The apparatus of claim 5 and in addition:

second bandpass means for generating bandpass samples of the input signal;

said amplifying means responsive to said second bandpass means for amplifying the bandpass samples from said second bandpass means so that amplitude-controlled bandpass samples derived from the input signal are feed-forward to said summing means.

9. An adaptive magnitude equalizer in a signal channel for equalizing a magnitude transfer function as adapted for an input signal spectrum, said equalizer comprising:

sample means for generating a plurality of sampled bandpass signals having amplitudes characteristic of the input signal;

means for detecting the amplitude of each of said plurality of sampled bandpass signals;

means for supplying a reference signal;

difference means for generating a plurality of difference signals indicative of the difference between the amplitude of each of said plurality of sampled bandpass signals and said reference signal;

means for amplifying each of said plurality of sampled bandpass signals by a gain factor proportional to the absolute value of its associated difference signal to produce a plurality of modified signals; and means for summing the input signal with the plurality of modified signals to produce an output signal equalized to the desired transfer function for the input signal spectrum.

10. The apparatus of claim 9 further including:

means for weighting the amplitude of each of said plurality of sampled bandpass signals and said reference signal in inverse proportion to the product of the channel transfer function and the input signal spectrum energy content of the corresponding sampled bandpass signal whereby said difference means generates a plurality of difference signals indicative of the difference between a plurality of weighted sampled bandpass signals and the weighted reference signal.

11. The apparatus of claim 10 wherein sample means includes:

a plurality of filter means for passing a plurality of bandpass samples distributed over the input signal spectrum, each of said samples successively becoming the reference bandpass sample for the next adjacent sample.

12. The apparatus of claim 11 wherein:

one of said filter means for passing a reference bandpass sample, said reference bandpass sample occurs in a frequency range where the magnitude transfer function is substantially constant.

* * * * *